Dec. 8, 1959  R. D. WELCH  2,916,256
ROTOR CONSTRUCTION FOR COMPRESSORS AND TURBINES
Filed Sept. 21, 1955  2 Sheets-Sheet 1
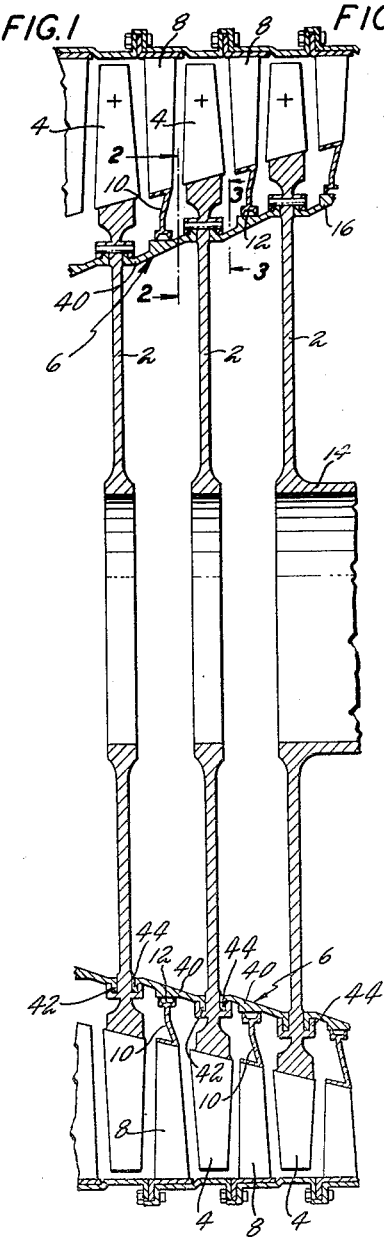
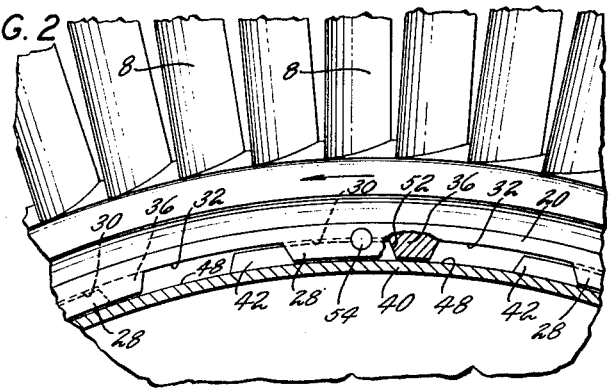
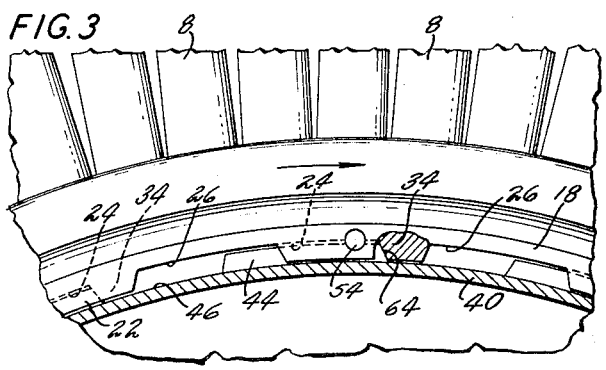
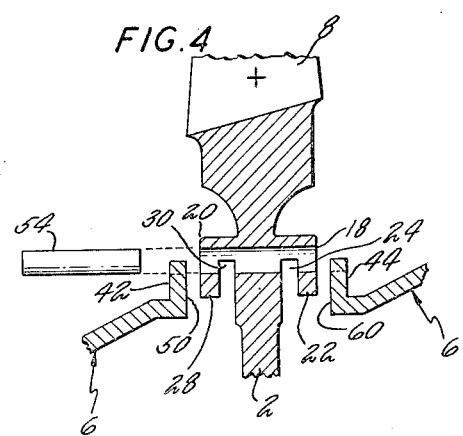
INVENTOR
RICHARD D. WELCH
BY *Jack N. McCarthy*
AGENT

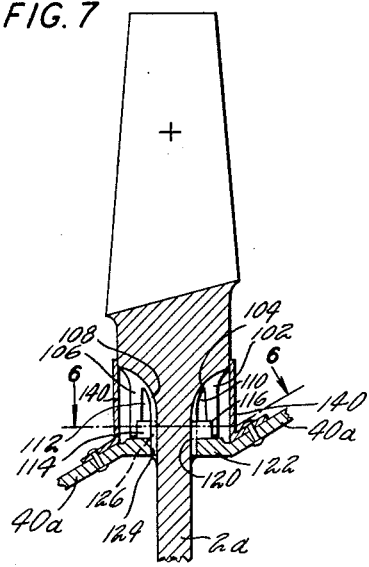
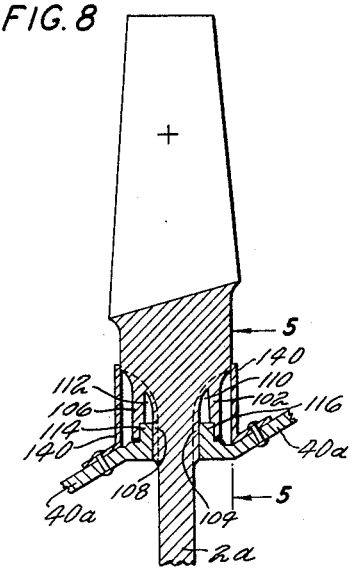
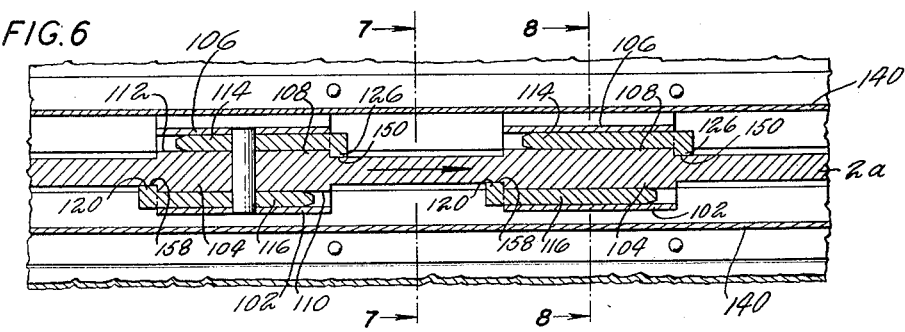
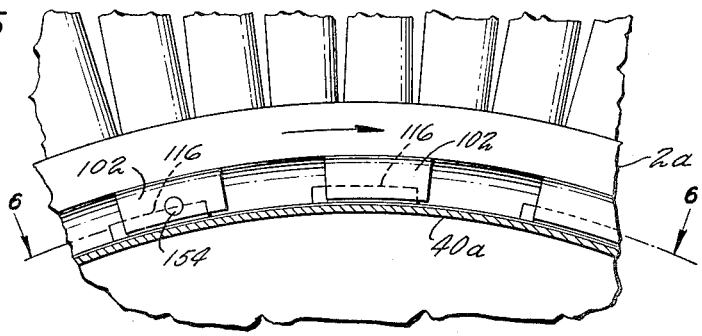

United States Patent Office 2,916,256
Patented Dec. 8, 1959

2,916,256

ROTOR CONSTRUCTION FOR COMPRESSORS AND TURBINES

Richard D. Welch, Manchester, Conn., assignor to United Aircraft Corporation, East Hartford, Conn., a corporation of Delaware Application September 21, 1955, Serial No. 535,567

13 Claims. (Cl. 253—39)

This invention relates to axial flow compressors or turbines and particularly to the spacer construction provided between adjacent discs of a multistage rotor.

In making a multistage rotor for either a compressor or a turbine, several aligned discs each carrying blades on its periphery have been, in the past, clamped together in end-to-end relation either by a central bolt or by a ring of axially extending bolts positioned in aligned holes in the discs. The discs are held in axially spaced relation to provide for positioning of a row of stationary blades between adjacent rows of blades. Spacing means are generally annular flanges on opposite sides of each disc engaging similar flanges on adjacent discs. The clamping bolts are generally located adjacent to these flanges to minimize bending loads on the discs.

The spacing flanges are generally made thick enough to enclose the bolt fully thus requiring that the radial thickness of the flange be greater than the diameter of the bolts as shown, for example, in Meier Patent No. 2,427,614. Where the weight of the power plant is critical, as in aircraft power plants, the excessive thickness of these flanges causes unnecessary weight.

An object of this invention is to reduce the weight of compressor and turbine construction by providing spacers separating the discs with slots on each side to engage cooperating members on the discs.

Another object of this invention is to provide a disc spacing means which does not require intricate machining.

A further object of this invention is to provide a spacer which will transmit the torque from one disc to another by means of stops which are positively fixed to the driving and driven members.

Another object of this invention is to provide a rotor construction which may be built up with a minimum of effort.

A further object of this invention is to provide a rotor construction in which a disc may be removed from the center thereof with a minimum of rotation of the assembly and a minimum of disassembly of the engine.

Other objects and advantages will be apparent from the specification and claims and from the accompanying drawings which illustrate an embodiment of the invention.

Fig. 1 is a longitudinal sectional view through a rotor incorporating the invention.

Fig. 2 is a fragmentary sectional view on a larger scale taken along the line 2—2 of Fig. 1 showing the connection between a driving disc and a driven spacer.

Fig. 3 is a fragmentary view partially in section on a larger scale taken along the line 3—3 of Fig. 1 showing the connection between a driving spacer and a driven disc.

Fig. 4 is an enlarged exploded view of the connection of a disc to adjacent spacers as shown in Fig. 1.

Fig. 5 is a fragmentary view partially in section showing the connection between a driving spacer and a driven disc of a modification of the invention omitting the windage guard.

Fig. 6 is a sectional view taken along the line 6—6 of Fig. 5.

Fig. 7 is a sectional view showing the connection of a disc to adjacent spacers taken along the line 7—7 of Fig. 6.

Fig. 8 is a sectional view showing the connection of a disc to adjacent spacers taken along the line 8—8 of Fig. 6.

Section lines 5—5 and 6—6 have been placed on Figs. 8 and 7 respectively to aid in orienting Figs. 5 and 6 with Figs. 7 and 8.

The invention is shown in a compressor rotor although it will be understood that the invention is equally applicable to a turbine rotor. In the arrangement shown, the compressor rotor includes a plurality of discs 2 each having a row of blades 4 on its periphery. The discs are spaced apart by spacing devices 6, hereinafter described in detail, such that the rows of stationary vanes 8 of the stator may be positioned between adjacent rows of blades. The diaphragm 10 extending inwardly from the inner ends of the stationary vanes 8 carries a diaphragm seal 12 which cooperates with the spacer device for preventing leakage of power fluid around the inner ends of the rows of stationary vanes.

As shown in Fig. 1, the shaft 14 driven by the turbine (not shown) or any other driving means is connected to the inner periphery of the first disc 2 thus transmitting torque to this first disc. This disc 2 supports on one side, adjacent its outer periphery a seal member 16, and is connected to a spacer device 6 on its other or forward side. In the build-up of this construction this spacer device is then drivingly connected at its forward end to the next disc 2 so as to drive this next disc which in turn drives the next spacer device 6 as did the first disc 2. This construction is carried through until the desired number of discs or compressor stages have been obtained. The forwardmost disc maybe supported for rotation by any means desired (not shown).

As shown in Figs. 3 and 4, each disc 2 has formed thereon adjacent its outer periphery axially extending annular flanges 18 and 20 on opposite sides of the disc, the flanges 18 extending rearwardly. From the free end of each flange 18, flanges, or projections, 22 extend radially inwardly therefrom forming a series of grooves 24. Each groove extends substantially the width of a projection 22. A stop 34 is fixed in each groove 24 therein connecting the end of each projection 22 to the main body of the disc. As viewed in Fig. 3, these stops 34 are located at the clockwise end of the groove. The projections 22 are spaced equally around the flange 18 with the spaces 26 between the projections being approximately equal in circumferential width to the circumferential width of the projections.

As shown in Figs. 2 and 4, each disc 2 also has thereon adjacent its outer periphery the axially extending annular flange 20 which extends forwardly and is preferably directly opposite to the flange 18. From the free end of each flange 20, flanges, or projections, 28 extend radially inwardly therefrom forming a series of grooves 30. Each groove extends substantially the width of a projection 28. A stop 36 is fixed in each groove 30 therein connecting the end of each projection 28 to the main body of the disc. As viewed in Fig. 2, these stops 36 are located at the clockwise end of the groove. The projections 28 are spaced equally around the flange 20 with the spaces 32 between the projections being approximately equal in circumferential width to the circumferential width of the projections. The section of Fig. 2 is taken in the direction opposite to the section of Fig. 3 so that although the stops 34 and 36 are shown at the same ends of the grooves it will be understood that the stops on opposite sides of any one disc 6 are in fact at opposite ends of the grooves. That is to say, as viewed from the rear as in Fig. 3, the stops 34 are at the clockwise end of the grooves whereas the stops 36 are at the counterclockwise end of the grooves on the other side of the disc.

Each spacer device 6 comprises an annular ring 40 having a series of projections 42 extending radially outwardly from its rearward end and a series of projections 44 extending radially outwardly from its forward end. Projections 42 and 44 are spaced equally around the ends of each spacer device 6. The projections 44 are of such a number and of such a circumferential width as to fit one each within the spaces 26 between adjacent flanges 22 of a disc. The spaces 46 between the projections 44 are of such a size so that the projections 22 of a disc will pass therethrough. The projections 28 or 22 and the cooperating flanges 42 or 44 constitute interrupted flanges which are adapted to fit one with another such that the interrupted flanges engage within the interrupted grooves 24 or 30.

Projections 42 are of such a number and width so as to fit one each within the spaces 32 of a disc. The spaces 48 between the projections 42 are of such a size so that the projections 28 of a disc will pass therethrough. The projections 42 and 44 are of such a thickness as to be received in the grooves 30 and 24 respectively.

In assembly of this rotor construction, the unit may be built up in the following manner: (1) A seal member 16 is placed in position on the rearwardmost disc 2. This seal member may be fixed to the disc by means similar to the connection between a spacer device and disc or by any other means. (2) The rearward end of an annular ring 40 of a spacer device 6 is placed adjacent the forward face of the first disc 2. (3) The projections 42 of the annular ring 40 are lined up one with corresponding spaces 32 between the flanges 28 on the forward face of the disc 2. (4) The ring 40 and the disc 2 are moved toward each other so that the projections 42 on the annular ring pass through the spaces 32 on the disc and the rearward faces 50 of the projections abut the disc 2. (5) The disc 2 and annular ring 40 are then turned angularly relative to each other so that the projections 42 move in a circumferential direction to be placed each within its cooperating groove 30 with the end faces 52 of each projection, which constitute stop means, abutting a cooperating stop 36. To prevent these members from backing apart, a pin 54 is provided which extends through the disc 2 and a portion of the projections 42 of the annular ring 40. The hole through the disc 2 and the grooves in the projections 42 may be drilled in one operation together or preformed. (6) The forward end of the annular ring 40, which is referred to above, of a spacer device 6 is placed adjacent the rearward face of a second disc 2. (7) The projections 44 of this annular ring 40 are lined up one with corresponding spaces 26 between the projections 22 on the rearward face of the second disc 2. (8) This ring 40 and the second disc 2 are moved toward each other so that the projections 44 on the annular ring pass through the spaces 26 on the disc and the forward faces 60 of the projections abut the second disc 2. (9) The second disc 2 and annular ring 40 are then turned angularly relative to each other so that the projections 44 move in a circumferential direction to be placed each within its cooperating groove 24 with each of the end faces 64 of each projection, which constitute stop means, abutting a stop 34. (10) The rearward end of a second annular ring 40 of a spacer device 6 is placed adjacent the forward face of the second disc 2. (11) This procedure is now repeated as outlined from item 3 until the desired number of discs are obtained. (12) To prevent the backing off of these connected assemblies a pin 54 is provided which extends through each disc 2 and a portion of the projections 42 and 44 of the adjacent annular rings 40. These pins 54 may be attached or fixed in position by any satisfactory means. As stated hereinbefore the hole in the disc or groove in the spacer device may be preformed or drilled when each connection is assembled. These pins are inserted as the assembly is built up.

It is to be noted that the thickness of each projection 44 and each projection 42 is slightly greater than the width of their respective grooves 24 and 30 thus causing a force fit and a prestressing of the disc projections 22 and 28 so that they may carry the thrust load without deflecting. These extending projections act in a manner as springs.

*Operation*

As the shaft 14 is rotated in a counterclockwise direction as viewed from the rear of the engine or compressor, the rearwardmost disc 2 drives the seal member 16 fixed to the rearward side thereof and drives the rearward end of the adjacent annular ring 40 of spacer device 6. This drive is transmitted from the disc 2 to the spacer device 6 by means of the stops 36 of the disc and projections 42 of the spacer. The forward end of this annular ring 40 in turn drives the second disc 2. This drive is transmitted from the annular ring 40 to the next disc 2 by means of the projections 44 of the spacer and stops 34 of the disc. This drive continues through each successive disc and spacer.

As shown in Figs. 7 and 8, in this modification of the invention, each disc 2a has formed thereon adjacent its outer periphery on its rearward side a series of radially inwardly extending flanges, or projections, 102 and radially and axially extending bosses 104. These projections and bosses are juxtaposed forming a groove 110 therebetween and are spaced equally around the disc. Each disc 2a also has formed thereon adjacent its outer periphery and on its forward side a series of similar radially inwardly extending flanges, or projections, 106 and radially and axially extending bosses 108. These projections and bosses are juxtaposed forming a groove 112 therebetween and are spaced equally around the disc. The spaces between the adjacent bosses and adjacent projections on both sides are approximately equal in circumferential width to the circumferential width of the respective projections and bosses. The bosses are integral extensions on the sides of the disc and define recesses in the face of the disc between the bosses.

Each spacer device 6 comprises an annular ring 40a having a series of projections 114 extending radially outwardly from its rearward end and a series of similar projections 116 extending radially outwardly from its forward end. Projections 114 and 116 are spaced equally around the ends of each spacer device 6. The projections 116 are such in number and circumferential width as to fit within the spaces between the projections 102. The spaces between the projections 116 are such a size that the projections 102 on a disc will pass therethrough.

Projections 114 are such in number and circumferential width as to fit within the spaces between projections 106. The spaces between the projections 114 are such a size that the projections 106 on a disc will pass therethrough.

Each projection 116 and adjacent end edge 122 of annular ring 40a has a forwardly extending abutment 120 (see Fig. 7). These abutments 120 are located as viewed in Fig. 5 at the counterclockwise end of the projection 116. Each projection 114 and adjacent end edge 124 of annular ring 40a has a rearwardly extending abutment 126 (see Fig. 7). These abutments 126 are located as viewed in Fig. 6 on the right side of the projection 114. Annular windage guards 140 are provided to reduce windage losses and may be attached to the ring 40a as shown.

In assembly of a rotor of the construction as shown in the modification, the unit may be built up in the following manner: (1) A seal member 16 is placed in position on the rearwardmost disc 2a. This seal member may be fixed to the disc by means similar to the connection between a spacer device and disc or by any other means. (2) The rearward end of annular ring 40a of a spacer device 6 is placed adjacent the forward face of the first disc 2a. (3) The projections 114 of the annular ring 40a are lined up one with each space between projections 106 of the forward face of the disc 2a. (4) The ring 40a and the disc 2a are moved toward each other so that the projections 114 on the annular ring pass through the spaces between the projections 106 on the disc and the faces 150 of the abutments 126 abut the disc 2a one each in a space formed between adjacent bosses 108; this action aligns each projection 114 with a cooperating groove 112. (5) The disc 2a and annular ring 40a are then turned angularly relative to each other so that the projections 114 move in a circumferential direction to be placed each within its cooperating groove 112 with each of the abutments 126 engaging a boss 108. To prevent these members from backing apart, or off, a pin 154 is provided which extends through the disc 2a and a portion of the projections 114 of the annular ring 48. The hole through the disc 2a and the grooves in the projections 114 may be drilled in one operation together or preformed. (6) The forward end of the annular ring 40a, which is referred to above, of a spacer device 6 is placed adjacent the rearward face of a second disc 2a. (7) The projections 116 of this annular ring 40a are lined up one with each space between projections 102 of the rearward face of the disc 2a. (8) This ring 40a and the second disc 2a are moved toward each other so that the projections 116 on the annular ring pass through the spaces between the projections 102 on the disc and the faces 158 of the abutments 120 abut the disc 2a one each in a space formed between adjacent bosses 104; this action aligns each projection 116 with a cooperating groove 110. (9) The second disc 2a and annular ring 40a are then moved relative to each other so that the projections 116 move in a circumferential direction to be placed each within its cooperating groove 110 with each of the abutments 120 engaging a boss 104. (10) The rearward end of a second annular ring 40a of a spacer device 6 is placed adjacent the forward face of the second disc 2a. (11) The procedure as outlined from item 3 is now repeated until the desired number of discs are obtained. (12) To prevent the backing up of these connected assemblies a pin 154 is provided which extends through each disc 2a and a portion of the projections 114 and 116 of the adjacent annular rings 40a. Any number of pins may be used around a disc. These pins 154 may be attached or fixed in position by any satisfactory means. As stated hereinbefore, the hole in the disc or grooves in the spacer device may be preformed or drilled when each connection is assembled. These pins are inserted as the assembly is built up.

It is to be noted that the open end of each groove 110 and 112 has been machined to receive projections 116 and 114, respectively. The thickness of each projection 116 and each projection 114 is slightly greater than the width of this machined portion just referred to, thus causing a force fit and a prestressing of the projections 102 and 106 so that they may carry the thrust load without deflecting. These projections act in a manner as springs.

*Operation*

As the shaft 14 is rotated in a counterclockwise direction as viewed from the rear of the engine or compressor, the rearwardmost disc 2a drives the seal member 16 fixed to the rearward side thereof and drives the rearward end of the adjacent annular ring 40a or spacer device. This drive is transmitted from the disc 2a to the ring or spacer 40a by means of the bosses 108 of the disc and abutments 126 of the spacer. The forward end of this annular ring 40a in turn drives the second disc 2a. This drive is transmitted from the annular ring 40a to the ring disc 2a by means of the abutments 120 of the spacer and bosses 104 of the disc. This drive continues through each successive disc and spacer.

While the flanges, or projections, 22, 28 and 102, 106 on the discs have been described as extending inwardly or downwardly and the projections 42, 44 and 114, 116 on the spacers have been described as extending outwardly, it is to be understood that this arrangement may be reversed; that is, the projections on the discs could extend outwardly and the projections on the spacers could extend inwardly.

Although only two arrangements have been shown and described herein for purposes of illustration, it will be evident to those skilled in the art that the invention is capable of various modifications and adaptations within the scope of the appended claims.

I claim:

1. In a rotor construction, a plurality of discs each having a row of blades on its outer periphery, a spacer device connecting each disc to its adjacent disc, each disc having adjacent its outer periphery on each side a plurality of radially extending flanges, each spacer device comprising an annular ring, the end of each annular ring having a plurality of projections extending radially therefrom, each of said projections on one end of each spacer being positioned between a flange on an adjacent disc and said disc, each of said flanges biasing its associated projection toward the disc to which the flange is attached, and cooperating stop means on each disc and associated spacer device to transmit torque between the members so that the unit will rotate, said last named means including abutments extending one from each projection on each annular ring, said abutments aligning the projections for engagement with their respective flanges and providing the torque carrying members of the spacers.

2. In a rotor construction, a plurality of discs each having a row of blades on its outer periphery, a spacer device connecting each disc to its adjacent disc, each disc having adjacent its outer periphery on each side a plurality of radially extending flanges, each spacer device comprising an annular ring, the end of each annular ring having a plurality of projections extending radially therefrom, each of said projections on one end of each spacer being positioned between a flange on an adjacent disc and said disc, each of said flanges biasing its associated projection toward the disc to which the flange is attached, cooperating stop means on each disc and associated spacer device to transmit torque between the members so that the unit will rotate, said last named means including abutments extending outwardly one from each projection on each annular ring, said abutments aligning the projections for engagement with their respective flanges and providing the torque carrying members of the spacers, and means for holding each disc and its adjacent spacers together including a pin passing through said disc and adjacent spacers.

3. In a rotor construction, a plurality of discs each having a row of blades on its outer periphery, a spacer device connecting each disc to its adjacent disc, each disc having adjacent its outer periphery on each side a plurality of radially extending flanges, each spacer device comprising an annular ring, the end of each annular ring having a plurality of projections extending radially therefrom, each of said projections on one end of each spacer being positioned between a flange on an adjacent disc and said disc, each of said flanges biasing its associated projection toward the disc to which the flange is attached, and cooperating stop means on each disc and associated spacer device to transmit torque between the members so that the unit will rotate, said last named means including abutments extending outwardly one from each projection on each annular ring, said abutments aligning the projections for engagement with their respective flanges and providing the torque carrying members of the spacers, and means for holding each disc and its adjacent spacers together including a pin, each pin passing through a hole in said disc and engaging a groove in each aligned flange of said spacers.

4. In a rotor construction, a plurality of discs each having a row of blades on its outer periphery, a spacer device connecting each disc to its adjacent disc, each disc having adjacent its outer periphery on each side a plurality of radially extending flanges, a recessed space is formed on each disc accessible between adjacent flanges, each spacer device comprising an annular ring, the end of each annular ring having a plurality of projections extending radially therefrom, each of said projections on one end of each spacer being positioned between a flange on an adjacent disc and said disc, each of said flanges biasing its associated projection toward the disc to which the flange is attached, and cooperating stop means on each disc and associated spacer device to transmit torque between the members so that the unit will rotate, said last named means including abutments extending one from each projection on each annular ring, said abutments projecting one each into a cooperating recessed space and providing the torque carrying members of the spacers.

5. In a rotor construction, a plurality of discs each having a row of blades on its outer periphery, a spacer device connecting each disc to its adjacent disc, each disc having adjacent its outer periphery on each side a radially inwardly projecting flange defining a groove, each spacer device comprising an annular ring, each end of each annular ring having a flange projecting radially outwardly from said ring, said projecting flange on each end of a ring being positioned in the groove in the cooperating side of its adjacent disc, and cooperating stop means on said disc and spacer device to transmit torque between said disc and spacer device so that they will rotate together, said ring flange interlocking with the cooperating radially extending groove to prevent relative axial movement.

6. In a rotor construction, a plurality of discs each having a row of blades on its outer periphery, a spacer device connecting each disc to its adjacent disc, each disc having adjacent its outer periphery on each side an interrupted radially inwardly projecting flange defining a radial groove between the flange and the disc, each spacer device comprising an annular ring, each end of each annular ring having an interrupted radially outwardly projecting flange forming a series of projections extending radially outwardly from said ring, each of said projections on one end of a spacer device being positioned in the groove on the cooperating side of its adjacent disc such that the spacer device and disc are retained against relative axial movement, and cooperating stop means on said disc and spacer device to transmit torque between said disc and spacer device so that they will rotate together.

7. In a rotor construction, a plurality of discs each having a row of blades on its outer periphery, a spacer device connecting each disc to its adjacent disc, each disc having adjacent its outer periphery on each side an interrupted radially inwardly projecting flange defining a radially extending groove between the disc and flange, each spacer device comprising an annular ring, one end of each annular ring having an interrupted radially outwardly projecting flange forming a series of projections extending radially outwardly from said ring, each of said projections on one end of a spacer device being positioned in the groove on the cooperating side of its adjacent disc such that the spacer device and disc are retained against relative axial movement, means connected to a first disc for rotating said first disc, and cooperating means on each disc and spacer device drivingly connecting each adjacent disc and spacer device one to the other.

8. In a rotor construction, a plurality of discs each having a row of blades on its outer periphery, a spacer device connecting each disc to its adjacent disc, each disc having adjacent its outer periphery on each side an interrupted radially inwardly projecting flange defining a radially extending groove between the disc and flange, each spacer device comprising an annular ring, one end of each annular ring having an interrupted radially outwardly projecting flange forming a plurality of projections extending radially outwardly from said ring, each of said projections on one end of each spacer device being positioned each in a groove on the cooperating side of its adjacent disc such that the spacer device and disc are retained against relative axial movement, and cooperating stop means on each disc and associated spacer device to transmit torque between said disc and spacer device so that they will rotate together.

9. In a rotor construction, a plurality of discs each having a row of blades on its outer periphery, a spacer device connecting each disc to its adjacent disc, each disc having attached thereto adjacent its outer periphery on each side a radially projecting flange spaced from the disc to define a radially extending groove, each spacer device comprising an annular ring, each end of each annular ring having a flange projecting radially therefrom, the flange on one end of a spacer device being positioned in the groove between a flange on an adjacent disc and said disc, said flanges overlapping in a radial direction such that relative axial movement between the disc and spacer device is prevented, and cooperating stop means on said disc and spacer device to transmit torque between said disc and spacer device so that they will rotate together.

10. In a rotor construction, a plurality of discs each having a row of blades on its outer periphery, a spacer device connecting each disc to its adjacent disc, each disc having adjacent its outer periphery on each side an interrupted radially projecting flange spaced from the disc to form a plurality of short circumferentially spaced radially extending grooves between the flange and the disc, each spacer device comprising an annular ring, one end of each annular ring having an interrupted flange projecting radially from the ring to form a plurality of circumferentially spaced projections overlapping radially with the cooperating disc flange, each of said projections on one end of each spacer device being positioned in the groove between a flange on an adjacent disc and said disc, and cooperating stop means on each disc and associated spacer device to transmit torque between said disc and associated spacer device so that they will rotate together.

11. In a rotor construction, a plurality of discs each having a row of blades on its outer periphery, a spacer device connecting each disc to its adjacent disc, each disc having adjacent its outer periphery on each side an annular axially projecting member, a plurality of circumferentially spaced flanges extending radially from said member, each spacer device comprising an annular ring, one end of each annular ring having a plurality of circumferentially spaced flanges projecting radially from the ring to form a plurality of circumferentially spaced projections, said plurality of projections on one end of each spacer device being positioned between a cooperating flange on an adjacent disc and said disc, said cooperating flange and said projections overlapping in a radial direction to retain the disc and spacer device against relative axial movement, each of said flanges being spaced slightly less axially from the disc than the axial thickness of the spaced projections, the flanges acting as springs and biasing its associated projection toward the disc to which the flange is attached, and cooperating stop means on each disc and associated spacer device to transmit torque between said disc and associated spacer device so that they will rotate together, said last named means including a stop located on each disc adjacent one end of each flange.

12. In a rotor construction, a pair of discs each having a row of blades on its periphery, a spacer ring between said discs and locking said discs together, one of said discs having, on the side adjacent to the ring, an annular interrupted flange spaced axially from the disc and projecting radially to define a radially extending interrupted groove, the cooperating spacer ring having, on the end adjacent to said groove, a radially projecting interrupted flange, said last flange engaging in said groove, said flange on the spacer and the cooperating flange on the disc overlapping in a radial direction to prevent relative axial movement between spacer ring, disc and cooperating means on said spacer and disc for limiting relative turning movement between said disc and ring when said flange is in said groove, and means on the other of said discs and on the spacer ring for holding said other disc and said spacer ring locked together.

13. In a rotor construction, a pair of discs each having a row of blades on its periphery, a spacer ring between said discs and locking said discs together, each disc having, on the side adjacent to the ring, an annular interrupted flange spaced axially from the disc and projecting radially to define a radially extending interrupted groove, said interrupted flange constituting circumferentially spaced flange elements, the cooperating spacer ring having at each end a radially extending interrupted flange forming circumferentially spaced flange elements, said ring flange at one end of the ring engaging in the adjacent groove, the circumferential dimension of each flange element on the disc being slightly less than the circumferential spacing of adjacent flange elements on the spacer ring to provide for axial assembly, and means for limiting the turning movement of each disc with respect to the spacer ring including a stop on the disc engageable with the ring.

References Cited in the file of this patent

UNITED STATES PATENTS

| | | |
|---|---|---|
| 1,021,222 | Wagner | Mar. 26, 1912 |
| 2,654,565 | Feilden | Oct. 6, 1953 |
| 2,662,685 | Blanc | Dec. 15, 1953 |
| 2,675,174 | McDowall et al. | Apr. 13, 1954 |
| 2,689,682 | Boyd et al. | Sept. 21, 1954 |
| 2,711,074 | Howard | June 21, 1955 |
| 2,772,853 | Woodworth | Dec. 4, 1956 |
| 2,773,667 | Wheatley | Dec. 11, 1956 |

FOREIGN PATENTS

| | | |
|---|---|---|
| 202,829 | Australia | July 20, 1956 |
| 644,481 | Great Britain | Oct. 11, 1950 |
| 887,689 | Germany | Aug. 27, 1953 |
| 960,069 | France | Oct. 17, 1949 |